United States Patent
Fan

(10) Patent No.: US 6,574,366 B1
(45) Date of Patent: Jun. 3, 2003

(54) LINE AND CURVE DETECTION USING LOCAL INFORMATION

(75) Inventor: Zhigang Fan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/448,135

(22) Filed: Nov. 24, 1999

Related U.S. Application Data

(63) Continuation of application No. 08/972,203, filed on Nov. 17, 1997, now Pat. No. 6,026,186.

(51) Int. Cl.$^7$ .................................................. G06K 9/46
(52) U.S. Cl. ...................................... 382/201; 382/291
(58) Field of Search ................................ 382/202, 201, 382/203, 217, 218, 281, 199, 135, 137, 286, 291; 358/488

(56) References Cited

U.S. PATENT DOCUMENTS

| | | | | |
|---|---|---|---|---|
| 4,707,647 A | * | 11/1987 | Coldren et al. ............. | 318/568 |
| 5,216,724 A | * | 6/1993 | Suzuki et al. ................. | 382/7 |
| 5,515,453 A | * | 5/1996 | Hennessey et al. ......... | 382/141 |
| 5,528,387 A | * | 6/1996 | Kelly et al. ................. | 358/488 |
| 5,533,144 A | * | 7/1996 | Fan ............................ | 382/135 |
| 5,764,788 A | * | 6/1998 | Barnes et al. ............... | 382/108 |
| 5,848,193 A | * | 12/1998 | Garcia ........................ | 382/232 |

* cited by examiner

*Primary Examiner*—Von J. Couso
(74) *Attorney, Agent, or Firm*—Aditya Krishnan; Mark Z. Dudley

(57) ABSTRACT

An image detection method is disclosed wherein local edge information within an image is utilized for accurately detecting lines and curves of the images. The method can more accurately determine the location and orientation of a pattern and thus provides more reliable image match for pattern detection. A detector is trained off-line with example images resulting in a stored template generated by recording a test pattern similar to a pattern to be tested; anchor lines are identified within said template. Long lines are detected in subsequent test patterns using the disclosed method. The template is rotated and shifted before matching it to the test pattern so that anchor lines align with long lines detected within the test pattern. The template and test pattern are then compared to determine whether there is a match. The system comprises a microprocessor is programmed to facilitate the training of a detector off-line with example images which are scanned into said system wherein a template is generated by recording an image pattern of said example images similar to a test pattern to be detected. The microprocessor identifies anchor lines within the template. It detects the long lines using the disclosed line detection method; rotates and shifts the template before matching it to the test pattern so that anchor lines align with lines which are detected within said test pattern; and compares the template to the test pattern to determine whether said anchor lines exist within said test pattern.

7 Claims, 3 Drawing Sheets

LINE AND CURVE DETECTION USING LOCAL INFORMATION

This application is a continuation of application Ser. No. 08/972,203, filed Nov. 17, 1997, now U.S. Pat. No. 6,026,186.

FIELD OF THE INVENTION

This invention is generally related to electronic image recognition techniques and, more particularly, to an electronic image detection method wherein local edge information is utilized for detecting lines and curves.

BACKGROUND OF THE INVENTION

A fundamental problem in electronic image recognition is line detection, or more generally, curve detection. In many applications, we want to find lines or other simple curves in a complex image or document. In a pre-scan image lines might be detected to decide where the edges of a paper document are. Within a document text lines may be used to estimate the skew angle of the document. Also, line and other simple curve detection often serves as the first step for complex object detection, as the contour of a complex object can always be decomposed into simple curves.

One example application of line detection is currency detection. The ability to detect currency patterns in an image can be useful in color copier machines or scanners for the purpose of preventing counterfeiting. The challenge of incorporating such a method in current copier or scanning technology lies in the difficulty with detecting images in a rotation or shift invariant manner. Specifically, the pattern could be of any orientation and at any location of the image. The orientation and the location of the image can be relatively simple to estimate using the line detection techniques.

Examples of skew angle identification and correction can be found in the following patents:

U.S. Pat. No. 5,528,387 to Kelly et al., issued Jun. 18, 1996, which teaches electronic image registration in a scanner. In particular, the edge data of a document is detected and skew angle calculated. The image is then rotated based upon the skew angle and non-image areas are filled using an image generation feature.

U.S. Pat. No. 4,922,350 to Rombola et al., issued May 1, 1990, discloses a two-pass scanning apparatus for detecting the size and position of an original document on a scanner platen. Image signals captured on a first scan are employed to determine boundaries and a best-fit magnification so that the image may be fed to a recording sheet using image signals generated on a subsequent scanning pass.

U.S. Pat. No. 5,253,765 to Moorehead et al, issued Oct. 19, 1003, teaches a system for sorting randomly sized objects (e.g. mushrooms). Invariant moments are employed, utilizing the complete pixel information for all pixels within the border of a captured image, to extract information about the mushroom size and orientation.

U.S. Pat. No. 5,220,398 to Horn et al. teaches an analog VLSI microchip that uses moments to determine the position and orientation of an object in a scene.

In "Invariant Fitting of Planar Objects by Primitives," published in 1996 IEEE Proceedings of ICPR '96, pp. 508–512 Voss et al, teach a method of pattern recognition using primitives such as triangles, rectangles, circles, ellipses, superquadratics, etc. The authors further describe a technique for describing the primitives using moments in a normalized manner; resulting in a decrease in the numerical effort.

In "Managing and Representing Image Workflow in Prepress Applications," Technical Association of the Graphic Arts (TAGA) Vol. 1, 1995 Proceedings, pp. 373–385, Venable et al. teach the use of structured images to manage prepress workflow.

The Hough Transform, is probably the most important and most widely-used algorithm for curve detection. The Hough Transform utilizes global feature information (sets of points belonging to a given curve) efficiently. However, prior applications totally ignore local information. This disclosure proposes to improve the Hough Transform by exploiting local information within images and documents. For each detected point a local edge direction is first estimated. This can be done by many standard methods such as that described by A. Rosenfeld and A. C. Kak in an article entitled "Digital Picture Processing", Academic Press, Inc., where a Sobel operator is used for gray images. The orientation of the estimated local edge controls the accumulation process in the Hough Transform. The disclosed method requires less computation and is more reliable in detection.

The counterfeit detection art includes methods that rely on point detection during recognition. As disclosed in U.S. Pat. No. 5,533,144 to Fan, entitled "Anti-counterfeit pattern detector and method", an anti-counterfeit detector and method identifies whether a platen image portion to be photocopied contains one or several note patterns. With the 144 method, the detection is performed in a rotation and shift invariant manner. Specifically, the pattern can be of any orientation and at any location of the image and can be embedded in any complicated image background. The image to be tested is processed block by block. Each block is examined to see if it contains an "anchor point" by applying an edge detection and orientation estimation procedure. For a potential anchor point, a matching procedure is then performed against stored templates to decide whether the pre-selected monetary note patterns are valid once detected.

Other pattern detection methods are presented by the following patents:

U.S. Pat. No. 4,153,897 Yasuda, et. al. Issued May 8, 1979

U.S. Pat. No. 5,216,724 Suzuki, et. al. Issued Jun. 1, 1993

U.S. Pat. No. 5,291,243 Hecknam, et. al. Issued Mar. 1, 1994

Yasuda et al. discloses a pattern recognition system where similarities between unknown and standard patterns are identified. Similarities are detected at first in respective shifting conditions where the unknown and standard patterns are relatively shifted from each other over the first limited extent, including the condition without shift. The maximum value of these similarities is then detected. The similarities are further detected in respective shifting conditions where the unknown and standard patterns are relatively shifted from each other over the second extent larger than the first limited extent, when the shifting condition which gave the maximum value is that without relative shift.

Suzuki et al. discloses an apparatus for image reading or processing that can precisely identify a particular pattern, such as banknotes or securities. A detecting unit detects positional information of an original image and a discriminating unit extracts pattern data from a certain part of the original image to discriminate whether the original image is the predetermined image based on the similarity between the pattern data and the predetermined pattern.

Heckman et al. discloses a system for printing security documents which have copy detection or tamper resistance in plural colors with a single pass electronic printer. A validating signature has two intermixed color halftone patterns with halftone density gradients varying across the signature in opposite directions, but different from the background.

All of the references cited herein are incorporated by reference for their teachings.

SUMMARY OF THE INVENTION

In order to more reliably and efficiently detect lines and curves, an electronic image detection method is now disclosed wherein local edge information is utilized. A currency detection method and system based on the disclosed line detection method is also presented.

With the presented method, the local edge information is applied to improve the line detection; the orientation of the local edge controls the accumulation process in Hough Transform.

With the presented currency detection method, a detector is trained off-line with example images resulting in a template generated by recording a test pattern similar to an image pattern to be tested; anchor lines are identified within the template; the long lines are detected during the testing using the disclosed line detection method; the template is rotated and shifted before matching the template to the test pattern so that the anchor lines align with long lines detected within the test pattern; and the template and the test pattern are compared to determine whether there is a match.

The method can be carried out in a system having a microprocessor programmed to carry out the above steps of the method. The system's microprocessor facilitates the training of a detector off-line with example images which are scanned into the system wherein a template is generated by recording an image pattern of the example images (patterns) similar to a test pattern to be detected. The microprocessor identifies anchor lines within the template; detects long lines during testing using the disclosed line detection method; rotates and shifts the template before matching the template to the test patterns so that the anchor lines align with long lines which may be detected within the test pattern, and compares the template to the test pattern to determine whether the anchor lines exist within the test pattern.

Other objects, advantages, and salient features of the invention will become apparent from the detailed description which, taken in conjunction with the drawings, disclose the preferred embodiments of the invention.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

The method presented herein is an improved-application of a Hough transform for image recognition and detection. The Hough transform improvement presented in this disclosure can be introduced with an example for straight line detection. As is generally known, a straight line can be represented by an equation:

$$y = x\tan\theta - b. \qquad (1)$$

With the present method, a 2-D (two-dimensional) array indexed by $(\theta, b)$ is built. For each detected point $P_i = (x_i, y_i)$, the line is constructed as, $$b = kx_i - y_i \qquad (2)$$

in the kb-plane, where $k = \tan\theta$; in other words, 1 is added (or an amount proportional to the strength of $P_i$ to each $(\theta, b)$ that lies on this line. It is easily verified that if the $P_i$'s are collinear, the corresponding lines all pass through the same point. Thus when we have constructed the lines corresponding to all the $P_i$'s, we should obtain peaks at the point in $(\theta, b)$ space that correspond to collinear sets of $P_i$'s, and the positions of these points determine the equations of the corresponding lines. As Equation (2) is evaluated for all possible orientation, the total computation for Hough Transform is to calculate equation (2) K times for each detected point, where $K = 180°/R$, R is the resolution for $\theta$ estimation. If 0.5° accuracy is required, $K = 360°$.

Hough Transform utilizes efficiently global feature information (sets of points belonging to a given curves). However, it totally ignores local information. For a line, the local edge orientation usually aligns with the line direction. We disclose an improved Hough Transform by exploiting local information. For each detected point, a local edge direction is first estimated. This can be done by many standard methods, for example using a Sobel operator. Equation (2) is then evaluated only for a small amount of orientations around $\phi$, which is the estimated local edge direction.

There are two advantages to this method. First, the required computation is reduced. We only have to evaluate (2) K* times, where $K^* = \Delta/R$ and $\Delta$ is a preset threshold which is determined by the accuracy of local edge direction estimation. For $\Delta = 10°$ and $R = 0.5°$, $K^* = 20$. The estimation for edge detection using a Sobel operator involves mainly one division. The total computation is typically much less than the standard Hough Transform.

Figure 1A:
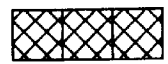
FIG. 1A illustrates three lines, each of which has three pixels.
Figure 1A:
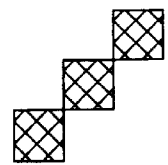
Figure 1A:
Figure 1B:
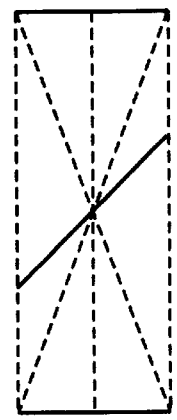
FIG. 1B illustrates five extra lines that are typically detected during normal Hough transform applications.
Figure 1C:
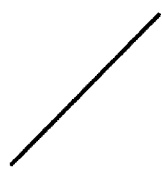
FIG. 1C illustrates the detection of only three lines where local edge information is utilized by the invention as proposed.

The underlying method disclosed herein is also more reliable in detection applications. This can be illustrated by the example of FIG. 1A, where three lines, each of which has three pixels, are illustrated. However, if a standard Hough Transform is applied, not only these three lines will be detected, but also five extra lines, represented as dotted lines in FIG. 1B, because both true lines and extra lines have the same counts (in this example three). This will not happen if we utilize the local edge information as proposed, wherein only the three lines will be recognized as shown in FIG. 1C.

Although the proposed method is illustrated for line detection, it can be easily generalized for circle or other simple curve detection.

As stated hereinbefore, one application of this method is in the image detection art where a detector system, incorporated within scanning systems or copiers, recognizes and authenticates images. The system is first trained off-line with example images. A template is created by recording the image pattern which will be compared against test images subsequently scanned by the system. Training of the system includes generating templates and selecting one or several pairs of anchor lines within the templates which should be identifiable within test images. The anchor lines are typically straight, and desirably long lines; they can be lines within a image pattern, or edges along an image. Each pair contains two lines which are orthogonal to each other in direction. The detector is trained off-line with currency images resulting in a template generated by recording a pattern similar to a test pattern to be sampled. Anchor lines are identified within said template.

Figure 2A:
FIG. 2A illustrates a sample template having anchor lines (dashed) which intersect in this sample—forming an "L" shape.
Figure 2B:
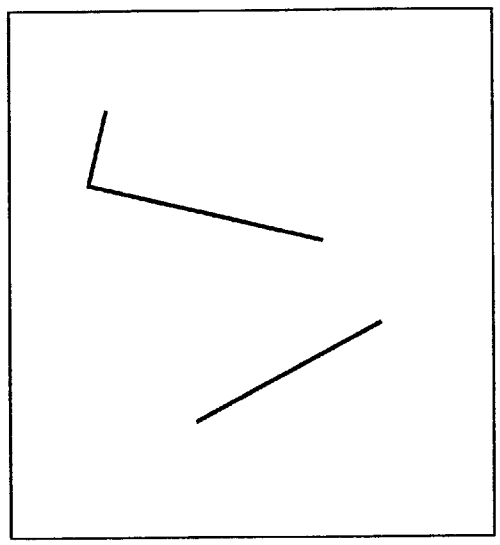
FIG. 2B illustrates anchor lines which may be found in a test image.
Figure 2C:
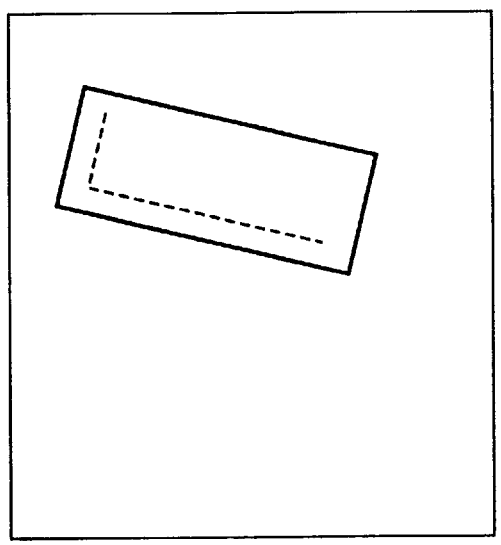
FIG. 2C illustrates detection of a legitimate currency after the template (FIG. 1A) is matched with the anchor lines within the image (FIG. 1B)

During detection the disclosed line detection method is first performed to detect long straight lines. The long lines detected are then grouped into pairs, each of which contain two long lines that are in orthogonal directions. Under the assumption that the detected long line pairs are the anchor line pairs, the test pattern is matched to the templates. FIG. 2A illustrates a sample template. Specifically, the template is first rotated and shifted before matching so that the anchor lines align with the long lines to be detected. This is best illustrated in FIG. 2B where the anchor lines are similar to the template are shown in the upper part of the Figure. A legitimate image pattern is declared to be detected after the template (FIG. 2A) is matched with the anchor lines within the tested image (FIG. 2B), as shown in FIG. 2C, wherein the template (FIG. 2A) is overlayed on top of the test pattern anchor lines of FIG. 2B. The test result may then be determined as positive.

Figure 3:
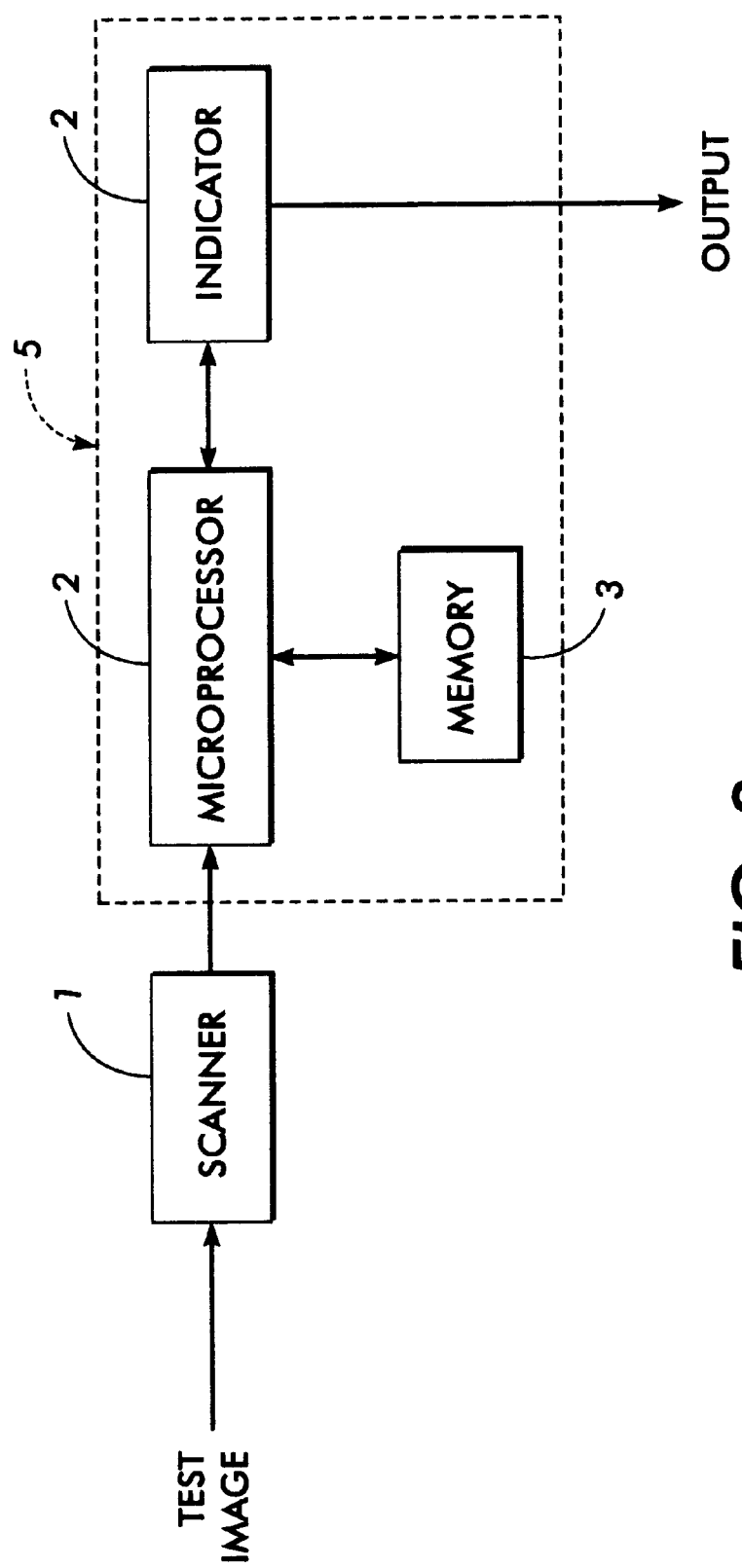
FIG. 3 is a block diagram of the system of the invention.

Referring to FIG. 3, system hardware necessary for the image detection system 5 would utilize a scanner 1 for receiving the test image, a microprocessor 2 programmed with the Hough transform to detect an image match by utilizing local edge information to detect lines and curves in scanned images, memory 3 for storing test patterns, and a indicator means 4 to indicate match detection. The detection system 5 facilitates the training of the microprocessor 2 (also referred to as "detector") off-line with sample images which are scanned 1 into said system wherein a template is generated by recording 3 an image pattern of said example notes similar to a test pattern to be detected. Anchor lines within the template would be identified by the microprocessor 2. The microprocessor system be programmed further to allow for the detection of the long lines using the disclosed line detection method and rotation and shifting of the template before matching it to the test pattern so that anchor lines may align with long lines which may be detected within the test pattern. The system 2 would then compare the template, held in memory 3, to the test pattern that is scanned 1 or viewed by an image capturing means to determine whether the anchor lines exist within the test pattern.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. An image detection method using line detection information of collinear sets of detected points, comprising:

training a detector off-line with example images wherein a template is generated by recording an image pattern of said example images similar to a test pattern to be detected;

identifying anchor lines within said template;

detecting long lines from collinear sets of detected points in the test patterns;

rotating and shifting said template before matching said template to said test pattern so that said anchor lines align with the detected long lines enabling detection within said test pattern; and comparing said template to said test pattern to determine whether said anchor lines exist within said test pattern.

2. The method of claim 1 comprising:

wherein training further comprises generating said templates by selecting at least one pair of anchor lines within said example images which include straight lines within a currency pattern or currency edges, and wherein said at least one pair of anchor lines contain two lines which are orthogonal to each other in direction.

3. The method of claim 2 comprising:

wherein said one or several pairs of anchor lines comprise straight lines within an image pattern.

4. The method of claim 3 comprising:

wherein said one or several pairs of anchor lines comprise straight lines along edges within an image pattern.

5. An image detection system, using line detection information of collinear sets of detected points, comprising:

means for training a detector off-line with example images wherein a template is generated by recording an image pattern of said example images similar to a test pattern to be detected;

means for identifying anchor lines within said template;

means for detecting long lines from collinear sets of detected points in the test patterns;

means for rotating and shifting said template before matching said template to said test pattern so that said anchor lines align with the detected long lines enabling detection within said test pattern; and means for comparing said template to said test pattern to determine whether said anchor lines exist within said test pattern.

6. An image detection method using line detection information of collinear sets of detected points, comprising:

training a detector off-line with example images wherein a template is generated by recording an image pattern of said example images similar to a test pattern to be detected;

identifying anchor lines within said template;

detecting long lines from collinear sets of detected points in the test patterns using a line detection method as follows:

a) building a 2-D army indexed by $(\theta,b)$ wherein a line, represented by an equation:

$$y = x\tan\theta - b$$

is constructed for each detected point $P_i=(x_i,y_i)$ as:

$$b = kx_i - y_i$$

in a kb-plane and wherein $k=\tan\theta$, for $\phi+\Delta<\theta<\phi-\Delta$, wherein $\phi$ is the edge orientation of the local edge and $\Delta$ is a preset parameter determined by the accuracy of the local edge orientation estimation;

b) constructing lines corresponding to all of said each detected point, c) obtaining peaks at the point (θ,b) that corresponds to collinear sets of said each detected point $P_i$, and d) determining a position for said each detected point $P_i$ through equations of corresponding lines, wherein the computation for determining lines and curves during image detection is obtained by calculating:

$$b=kx_i-y_i$$

K times for each detected point, wherein K=Δ/R and R is the resolution for θ estimation;

rotating and shifting said template before matching said template to said test pattern so that said anchor lines align with the detected long lines, enabling detection within said test pattern; and comparing said template to said test pattern to determine whether said anchor lines exit within said test pattern.

7. An image detection system, using line detection information of collinear sets of detected points, comprising:

means for trading a detector off-line with example images wherein a template is generated by recording an image pattern of said example images similar to a test pattern to be detected;

means for identifying anchor lines within said template;

means for detecting long lines from collinear sets of detected points in the test patterns using a line detection method as follows:

a) building a 2-D array indexed by (θ,b) wherein a line, represented by an equation:

$$y=x\tan\theta-b$$

is constructed for each detected point $P_i=(x_i,y_i)$ as:

$$b=kx_i-y_i$$

in a kb-plane and wherein k=tan θ, for φ+Δ<θ<φ-Δ, wherein φ is the edge orientation of the local edge and Δ is a preset parameter determined by the accuracy of the local edge orientation estimation, b) constructing lines corresponding to all of said each detected point, c) obtaining peaks at the point (θ,b) that corresponds to collinear sets of said each detected point $P_i$, and d) determining a position for said each detected point $P_i$ through equations of corresponding lines; wherein the computation for determining lines and curves during image detection is obtained by calculating:

$$b=kx_i-y_i$$

K times for each detected point, wherein K=Δ/R and R is the resolution for θ estimation;

means for rotating and shifting said template before matching said template to said test pattern so that said anchor lines align with the detected long lines enabling detection within said test pattern; and means for comparing said template to said test pattern to determine whether said anchor lines exist within said test pattern.

* * * * *